(12) United States Patent
Bock

(10) Patent No.: US 8,857,766 B2
(45) Date of Patent: Oct. 14, 2014

(54) AIRCRAFT COMPRISING A FUSELAGE WITH A FLOOR EXTENDING IN THE LONGITUDINAL PLANE OF THE FUSELAGE

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 367 days.

(21) Appl. No.: 12/443,093

(22) PCT Filed: Sep. 28, 2007

(86) PCT No.: PCT/FR2007/001594
§ 371 (c)(1),
(2), (4) Date: Mar. 26, 2009

(87) PCT Pub. No.: WO2008/040868
PCT Pub. Date: Apr. 10, 2008

(65) Prior Publication Data
US 2010/0084510 A1  Apr. 8, 2010

Related U.S. Application Data

(60) Provisional application No. 60/854,699, filed on Oct. 27, 2006.

(30) Foreign Application Priority Data

Sep. 29, 2006  (FR) ...................... 06 54016

(51) Int. Cl.
*B64D 13/00* (2006.01)
*B64C 1/00* (2006.01)
*B64D 11/00* (2006.01)

(52) U.S. Cl.
CPC .. *B64D 11/00* (2013.01); *B64C 1/00* (2013.01)
USPC ......................................... 244/120; 244/118.5

(58) Field of Classification Search
USPC ............... 244/177 R, 119, 120, 118.1, 118.5, 244/118.6
See application file for complete search history.

(56) References Cited

U.S. PATENT DOCUMENTS 1,790,988 A * 2/1931 Lalli ............................. 244/13
1,905,389 A * 4/1933 Lanning ..................... 244/118.5
(Continued)

FOREIGN PATENT DOCUMENTS

DE   101 45 276      7/2003
DE   10145276 A1 *  7/2003  ................ B64C 1/18
(Continued)

OTHER PUBLICATIONS

Machine translation of RU00029030, pulled Dec. 4, 2012, p. 1-2.*
(Continued)

*Primary Examiner* — Elizabeth A Plummer
(74) *Attorney, Agent, or Firm* — Oblon, Spivak, McClelland, Maier & Neustadt, L.L.P.

(57) ABSTRACT

An aircraft including a fuselage that includes a floor extending in the longitudinal plane of the fuselage and separating a first space from a second space accommodated in the fuselage. The first space includes a fuselage portion having a length essentially equal to the width of the floor along the fuselage cross-section, and the distance between the fuselage portion and the floor is essentially constant along the width.

16 Claims, 3 Drawing Sheets

(56) References Cited

U.S. PATENT DOCUMENTS

| | | | |
|---|---|---|---|
| 4,458,864 A * | 7/1984 | Colombo et al. | 244/118.5 |
| 4,674,712 A * | 6/1987 | Whitener et al. | 244/119 |
| 4,678,226 A * | 7/1987 | Ishizuka et al. | 296/203.03 |
| 4,925,132 A * | 5/1990 | Zider | 244/118.1 |
| 5,086,996 A * | 2/1992 | Roeder et al. | 244/119 |
| 5,496,000 A * | 3/1996 | Mueller | 244/118.1 |
| 5,752,673 A * | 5/1998 | Schliwa et al. | 244/118.6 |
| 5,893,535 A * | 4/1999 | Hawley | 244/119 |
| 6,158,690 A * | 12/2000 | Wadey et al. | 244/17.27 |
| 6,382,556 B1 * | 5/2002 | Pham | 244/6 |
| 6,834,832 B2 * | 12/2004 | Jamgarov | 244/117 R |
| 6,834,833 B2 | 12/2004 | Sankrithi | |
| 7,395,989 B2 * | 7/2008 | Saint-Jalmes et al. | 244/118.1 |
| 7,614,583 B2 * | 11/2009 | White | 244/118.1 |
| 7,735,779 B2 * | 6/2010 | Griess et al. | 244/119 |
| 8,336,823 B2 * | 12/2012 | Saint-Jalmes et al. | 244/119 |
| 2003/0052226 A1 * | 3/2003 | Allen | 244/118.5 |
| 2003/0062449 A1 * | 4/2003 | Sankrithi | 244/118.6 |
| 2003/0080243 A1 * | 5/2003 | Hoisignton et al. | 244/13 |
| 2003/0192989 A1 * | 10/2003 | Owen et al. | 244/118.5 |
| 2004/0031881 A1 * | 2/2004 | Jamgarov | 244/117 R |
| 2007/0267544 A1 * | 11/2007 | Linero et al. | 244/118.5 |
| 2009/0250553 A1 * | 10/2009 | Bock | 244/118.5 |
| 2010/0012773 A1 * | 1/2010 | Im | 244/36 |
| 2010/0116932 A1 * | 5/2010 | Helou, Jr. | 244/118.1 |
| 2010/0187352 A1 * | 7/2010 | Yavilevich | 244/36 |
| 2012/0193470 A1 * | 8/2012 | Kosheleff | 244/102 R |
| 2013/0119198 A1 * | 5/2013 | Campbell | 244/118.5 |

FOREIGN PATENT DOCUMENTS

| | | |
|---|---|---|
| EP | 0 662 411 | 7/1995 |
| EP | 1 332 961 | 8/2003 |
| FR | 1 167 722 | 11/1958 |
| RU | 2132291 C1 | 6/1999 |
| RU | 2148534 C1 | 5/2000 |
| RU | 00029030 | 4/2003 |

OTHER PUBLICATIONS

Office Action issued Jan. 11, 2011, in Chinese Patent Application No. 200780036150.6 (with English abstract).

U.S. Appl. No. 12/374,756, filed Jan. 22, 2009, Bock.

Russian Office Action dated Jul. 22, 2011, in Patent Application No. 2009116269/11 (022348) with English-language Translation.

Chinese Office Action dated Aug. 31, 2011, in Patent Application No. 200780036150.6 with English-language Translation.

* cited by examiner

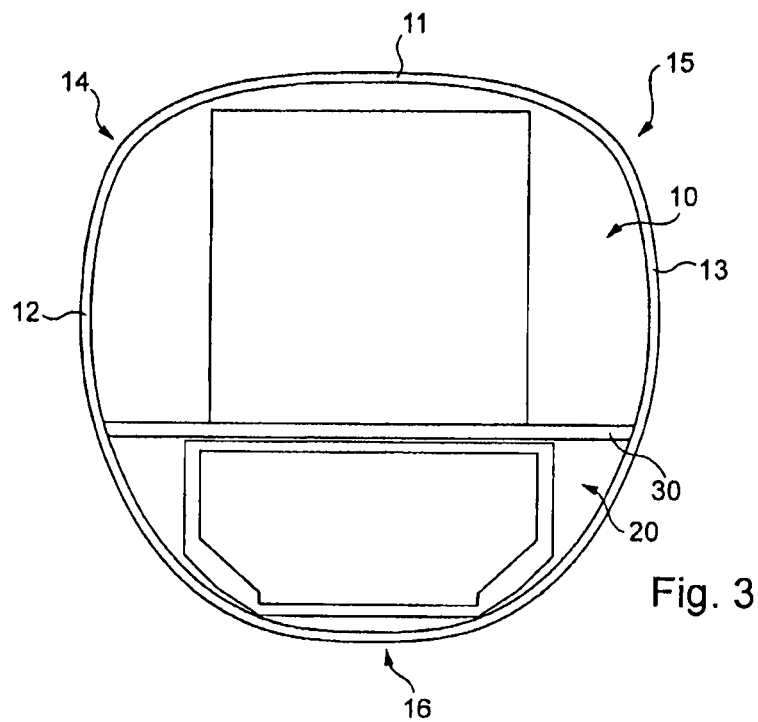
Fig. 3
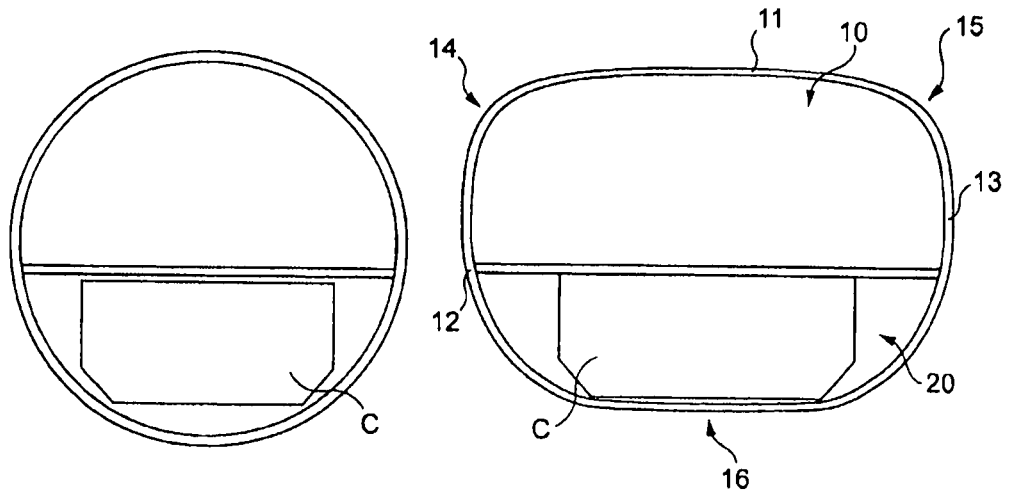
Fig. 5A
Prior art
Fig. 5B

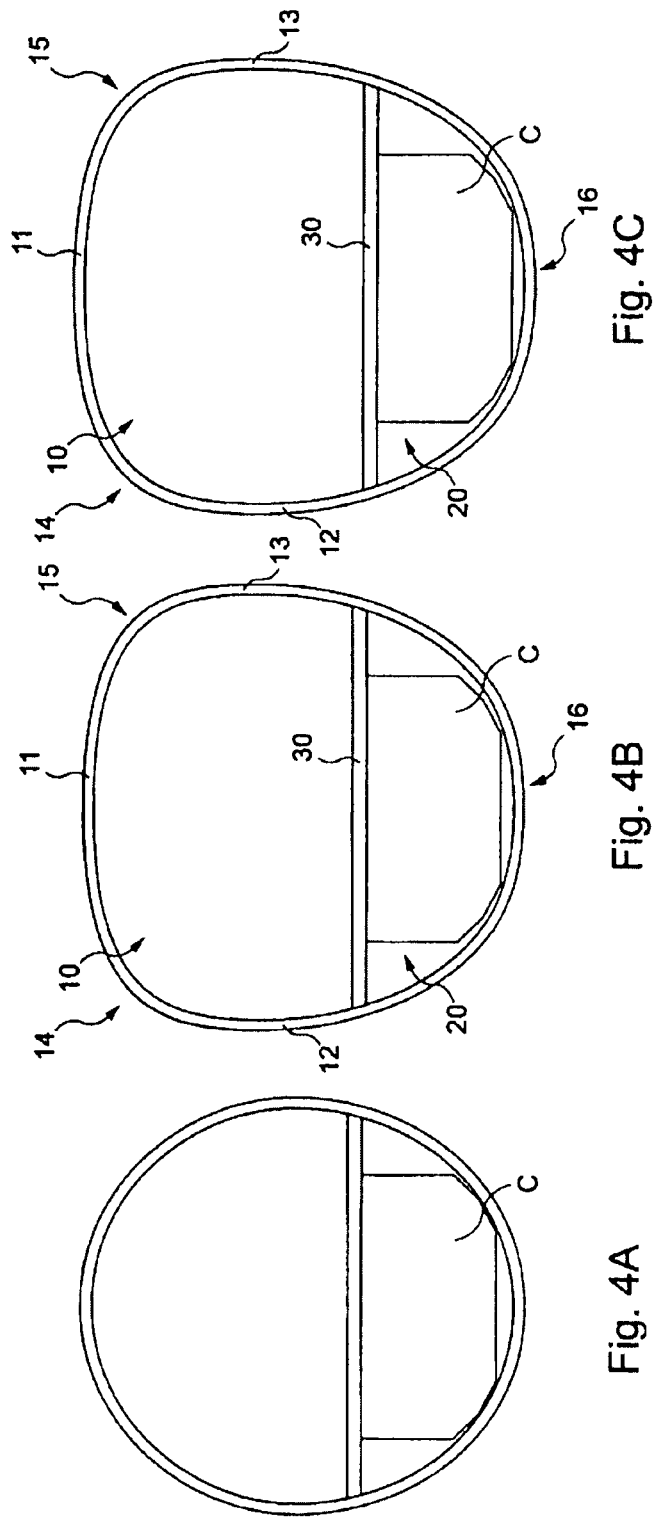

AIRCRAFT COMPRISING A FUSELAGE WITH A FLOOR EXTENDING IN THE LONGITUDINAL PLANE OF THE FUSELAGE

This invention relates to an aircraft comprising a fuselage having a floor extending in a longitudinal plane of the fuselage.

In general, this invention applies, in the field of aeronautics, to all the types of airplane in which a floor makes it possible to separate a first space from a second space accommodated in the fuselage.

In particular, when the aircraft is resting on the ground, the floor extends in a horizontal longitudinal plane of the fuselage and separates an upper first space from a lower second space, accommodated beneath the first space.

Traditionally, the first upper space is suited to the transport of passengers and the lower second space constitutes the baggage hold.

Generally, the fuselage of such an airplane has a cylindrical form, the floor extending in the width of the transverse section of the fuselage. The floor is positioned in such a way that the greatest distance separating the fuselage from the said floor in the upper first space exceeds the greatest distance separating the fuselage from the floor in the lower second space.

Taking into account the cylindrical form of the fuselage, the distance separating the fuselage from the floor in one or the other of the spaces varies in the transverse section of the fuselage, and in particular is very great at the center of the fuselage, at the axis of symmetry of the transverse section perpendicular to the floor and very slight on the sides, in the joining areas of the floor and the fuselage.

Thus, while it is possible for a person to move about easily in an aisle laid out at the center of the fuselage, the available height between the floor and the fuselage in the vicinity of the sides of the fuselage is slight and generally does not allow a person to stand up.

Furthermore, when the passengers are seated in the vicinity of the fuselage referred to as "window" side of the fuselage, there is only a slight space between the head of the seated passenger and the wall of the fuselage.

Likewise, in order to retain a sufficient height above the seats arranged on the sides of the fuselage, the space available for accommodating baggage in the compartments attached beneath the fuselage necessarily is restricted.

In the document U.S. Pat. No. 6,834,833 there is known an aircraft fuselage that is not cylindrical but has an oval form in its transverse section.

The transverse section of the fuselage thus has a horizontal diameter of a value in excess of that of the vertical diameter of the fuselage in this same transverse section.

In this way it is possible to obtain a wider and roomier space for the passengers.

This type of fuselage, however, has the same drawbacks as the cylindrical fuselage, since the passengers do not have the option of standing up in the side areas of the fuselage and there is only a very slight space at the level of the head of the passengers seated in the side seats, in the immediate vicinity of the wall of the fuselage.

This invention has as its purpose to resolve the aforementioned drawbacks and to propose an aircraft having a fuselage with an improved form, making it possible in particular to enhance the comfort of the passengers in their moving about as well as when they are seated.

To this end, this invention applies to an aircraft comprising a fuselage having a floor extending in a longitudinal plane of the said fuselage and separating a first space from a second space accommodated in the fuselage.

According to the invention, the first space comprises a fuselage portion of a length more or less equal to the width of the said floor in the transverse section of the fuselage, the distance separating the said fuselage portion and the said floor being more or less constant along the said width.

In this way, by virtue of this special form of the fuselage, and in particular of the specific fuselage portion provided for in a first space, the capacity to accommodate passengers in this first space is identical, at every point of the floor, at the center of the fuselage as well as on the sides.

Preferably, the said distance is greater than or equal to 1800 mm, and preferably greater than 2000 mm.

This considerable and more or less constant distance separating the fuselage portion from the floor over its entire width makes it possible to enhance the comfort of the passengers seated in the vicinity of the walls of the fuselage, on the sides of the airplane in its transverse section, by providing a sufficient space above the head of each seated passenger.

According to one advantageous characteristic of the invention, the said distance ranges between 2100 and 2200 mm, means creating a baggage accommodation being provided in the said first space in the vicinity of the said fuselage portion, the distance separating the said means creating a baggage accommodation and the said floor being greater than 1900 mm.

In this way, considerable spaces for accommodating baggage can be provided in the vicinity of the fuselage portion, since the distance separating the means for accommodating baggage is greater than 1900 mm over the entire width of the fuselage, and thus allows anyone to stand up irrespective of his position in the first fuselage space.

According to another advantageous characteristic of the invention, the fuselage has two other fuselage portions extending on the one hand between the fuselage portion and the floor of the first space, and on the other hand in the second space.

The fuselage thus has a special form made up of at least three fuselage portions connected to each other making it possible to define the first space and the second space separated by a floor.

According to the characteristics of the invention, the joining of the fuselage portion with each of the said two other fuselage portions is implemented more or less at the base of the joining of the floor with each of the said two other fuselage portions, respectively.

In this way, the first space, defined by the said fuselage portion, the floor and a part of the said two other fuselage portions has a more or less roomy interior space of rectangular form in the transverse section of the fuselage, particularly well suited not only to the moving about of the passengers in this space, but also to the accommodation of various containers in the event of use of the aircraft for the transport of freight.

Other features and advantages of the invention also will become evident in the description below.

In the attached drawings, given by way of non-limitative examples:

FIG. 3 is a schematic view in cross section of a fuselage of an aircraft according to a second embodiment of the invention;

FIGS. 4A, 4B and 4C are schematic views in cross section of a cylindrical fuselage of an aircraft of the prior art and of two aircraft fuselages according to two embodiments of the invention, respectively; and FIGS. 5A and 5B are schematic views in cross section of a cylindrical fuselage of a large-sized aircraft of the prior art and of a fuselage of a large-sized aircraft according to the invention, respectively.

First of all there will be described, in reference to FIG. 1, an aircraft fuselage according to a first embodiment of the invention, suited to the transport of passengers.

The entire remainder of the description relates to a fuselage of the airplane in its constant part which traditionally extends between a front portion and a tail portion which are streamlined to preserve the aerodynamic shape of the aircraft.

The fuselage thus has for the most part along its longitudinal axis a constant transverse section, that is, a transverse section considered in the plane perpendicular to the longitudinal axis of the fuselage.

The invention furthermore applies to a fuselage having two spaces, a first space 10 and a second space 20 separated by a floor that extends in a longitudinal plane of the fuselage, that is, in a plane parallel to the longitudinal axis of the fuselage.

When the aircraft is resting on the ground, this floor is intended to extend in a more or less horizontal plane, parallel to the ground.

In the remainder of the description, the first space of the fuselage, laid out above the floor when the aircraft is on the ground, will be designated as upper space 10, and the second space laid out beneath the floor and the first space when the aircraft is set down on the ground, as lower space 20.

Figure 1:
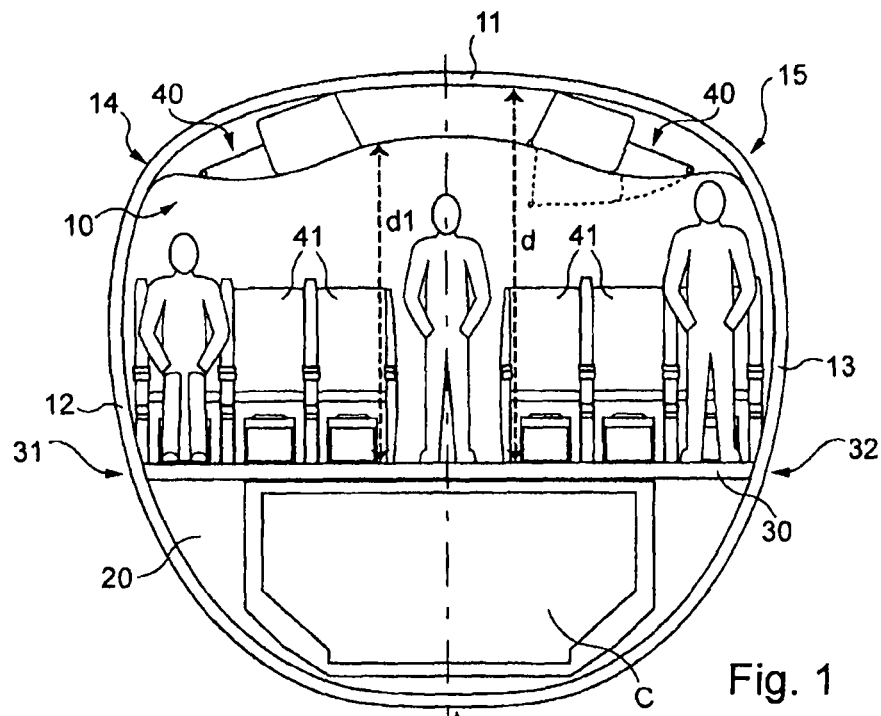
FIG. 1 is a schematic view in cross section of an aircraft fuselage according to a first embodiment of the invention and intended for the transport of passengers.

In the embodiment described in FIG. 1, the upper space 10 is suited to the transport of passengers and the lower space 20 traditionally is used as a baggage hold.

As illustrated clearly in FIG. 1, the fuselage of the aircraft according to the invention has a more or less "Wankel" form made up mainly of three fuselage portions 11, 12, 13 connected with each other at the three joining areas 14, 15, 16 arranged at the three vertices of a triangle, respectively.

The upper space 10 of the aircraft thus is defined by a first fuselage portion 11, referred to hereinafter as upper fuselage portion 11, the floor 30, and by a part of the two other fuselage portions 12,13, referred to hereinafter as side fuselage portions 12, 13.

The second space 20 of the aircraft furthermore is defined by the floor 30, and the complementary part of the two side fuselage portions as well as their joining area 16 more or less at the center of the fuselage.

In the upper space 10 of the fuselage, the upper fuselage portion 11 has a length more or less equal to the width of the floor 30 in the transverse section of the fuselage, that is, to the dimension of the floor 30 in the transverse section of the fuselage.

Thus, the joining of the upper fuselage portion 11 with each of the two side fuselage portions is implemented at the joining areas 14, 15 that are arranged more or less at the base of the joining areas 31, 32 of the floor 30 with each of the two side fuselage portions 12, 13.

As illustrated clearly in FIG. 1, this upper space 10 constitutes an accommodation of more or less rectangular form in the transverse section of the fuselage, thus affording a large accommodation capacity.

In particular, the distance d separating the upper fuselage portion 11 from the floor 30 is more or less constant along the width of the floor 30.

In practice, the floor 30 extends in a horizontal plane and the upper fuselage section 11 is made up of a portion of an arc of a circle with a relatively large radius, so that the distance separating the upper fuselage portion 11 from the floor remains relatively constant or has a slight variation.

By way of non-limitative example, the variation in height of this upper space 10 ranges between 5 and 10%.

In this way, if the distance d separating the upper fuselage portion 11 from the floor 30 at the central axis of symmetry D perpendicular to the floor 30 is more or less equal to 2100 mm, the distance separating the upper fuselage 11 from the floor 30 is at least 1890 mm in the vicinity of the side fuselage portions 12, 13.

The mean value of the distance d separating the upper fuselage portion 11 from the floor 30 thus ranges between 1900 and 2000 mm.

Thus the distance d separating the said upper fuselage portion 11 and the floor 30 will be considered as remaining constant along the width of the fuselage, since its variation in relation to the mean distance does not exceed 10%.

Furthermore, this distance d is greater than or equal to 1800 mm, making it possible, as illustrated clearly on FIG. 1, for a person to stand up at any point of the upper space 10, that is, at the central axis D of the fuselage as well as in the vicinity of the sides of the fuselage, at side fuselage portions 12, 13.

Preferably, this distance d ranges between 2100 and 2200 mm, and is equal, for example, to 2186 mm. Means creating baggage accommodations, traditionally made up of compartments 40 laid out above the seats, are provided in the upper space 10, in the vicinity of the upper fuselage portion 11.

These baggage compartments are arranged so that the distance d1, separating the means creating baggage accommodations 40 and the floor 30 is greater than 1900 mm.

The distance d1 in this way separating these baggage compartments 40 laid out above the seats 41 thus remains more or less identical over the entire width of the fuselage, so that a considerable clear space exists between the head of each passenger seated on the seats 41 and the baggage compartments 40, irrespective of their position in the transverse section of the fuselage.

Furthermore, the baggage compartments 40 can be integrated directly into the ceiling, such as clearly illustrated in FIG. 1.

In addition, by virtue of this special form of the upper fuselage space 10, more or less rectangular, the seats located in the vicinity of the sides of the fuselage can be identical to the other seats, unlike the circular-form fuselages of the state of the art, in which the seats close to the side wall of the fuselage must have a special form.

Finally, by virtue of the rectangular form of the upper space 10 of the fuselage, a gain in width is obtained and can be used in particular to provide a relatively wide central aisle between the seats.

It also will be noted that this particular form makes it possible to provide the passengers positioned in the vicinity of the side walls of the fuselage with more room, and in particular more freedom, for their arms.

Figure 2:
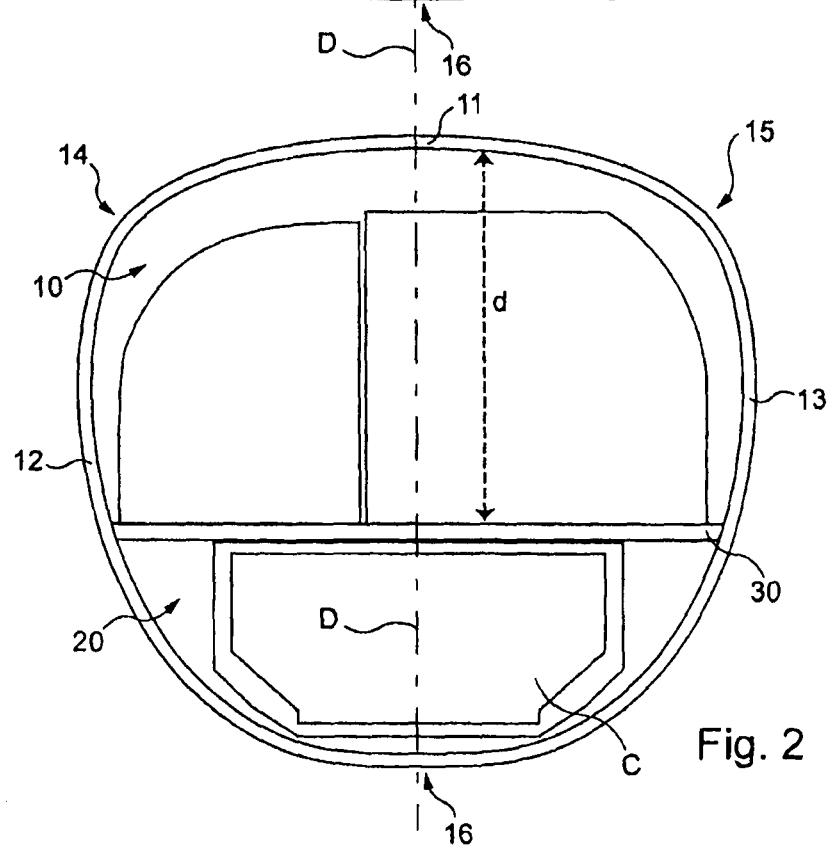
FIG. 2 is a schematic view in cross section of an aircraft fuselage identical to that of FIG. 1, and suited to the transport of freight.

Moreover, there has been illustrated in FIG. 2 the same fuselage structure, on which the numerical references corresponding to the identical parts of FIG. 1 have been adopted, for an aircraft intended to transport freight. By virtue in particular of the upper fuselage portion 11 that extends more or less at a constant distance and at least in excess of 1800 from the floor 30 over the entire width of the fuselage, it is possible to accommodate large parcels, corresponding to the standard-sized parcels transported by various international carriers of the Fedex, DHL, UPS type.

Furthermore, the second fuselage space 20 has a form in the transverse section of the fuselage suitable for adapting to the usual forms of container C.

In the embodiment described in FIGS. 1 and 2, upper fuselage portion 11 and the two side fuselage portions 12, 13 are portions of an arc of a circle with more or less identical radii.

Of course, the invention is not limited to this particular embodiment.

In FIG. 3, the identical parts bear the same references as in the exemplary embodiment described previously.

In this embodiment, the two side fuselage portions 12, 13 are identical and arranged symmetrically in relation to the axis of symmetry of the fuselage portion perpendicular to the floor 30 in the transverse section of the fuselage.

On the other hand, the upper fuselage portion 11 is not identical to the two side fuselage portions 12, 13, but extends over a sector smaller than the one over which side fuselage portions 12, 13 extend.

Thus, in this embodiment, upper fuselage portion 11 has a radius greater than the radius of the side fuselage portions 12, 13.

This embodiment even makes it possible to increase the distance separating the floor 30 from the upper fuselage portion 11 and in this way to obtain an upper space 10 in particular allowing very large-sized parcels to be accommodated.

Thus FIGS. 4A, 4B and 4C illustrate by way of comparison, for an airplane of average size, various fuselage forms according to the invention in relation to the traditional cylindrical fuselage form, such as illustrated in FIG. 4A.

The surface area of the transverse section of the cylindrical fuselage illustrated in FIG. 4A corresponds to an aircraft of the AIRBUS A320 type, with a transverse section surface area more or less equal to 14.01 m². By way of comparison, the fuselage such as illustrated in FIG. 4B, corresponding to the first embodiment of FIG. 1, has a transverse section surface area more or less equal to 15.48 m², while the fuselage illustrated in FIG. 4C, corresponding to the second embodiment illustrated in FIG. 3, has a transverse section surface area on the order of 16.38 m².

In this way, for more or less identical fuselage transverse section surface areas, it is possible to obtain, by virtue of the special form of the fuselage, an upper space 10 with greater accommodation capacity and affording greater comfort, in particular for the transport of passengers.

In this respect it will be noted that the lower space 20 is modified very little in its dimensions, so that it can fulfill perfectly its traditional function of baggage hold.

There also has been illustrated on FIG. 5A a cylindrical fuselage structure for a large-sized aircraft, of the AIRBUS A330/A340 type, of which the surface area of the transverse section of the fuselage may reach 24.98 m².

As illustrated in FIG. 5B, this invention also seeks to protect an embodiment in which the width of the fuselage at the floor level is increased in relation to a fuselage of a traditional aircraft.

By virtue of the special form of the fuselage according to the invention, in which this is not cylindrical but has at least three fuselage portions connected with each other, and one upper fuselage portion that extends more or less at a constant distance from the floor 30, it is possible with a floor of great width to maintain a transverse section surface area more or less identical to that of a traditional airplane with a cylindrical fuselage.

By way of example, the fuselage of the aircraft such as illustrated in FIG. 5B may have a transverse section surface area more or less equal to 29.96 m².

The invention claimed is:

1. An aircraft comprising:
a fuselage including a floor extending in a longitudinal plane of the fuselage and separating a first space from a second space accommodated in the fuselage,
wherein the first space includes an upper fuselage portion, which is an exterior wall of the aircraft, having a width substantially equal to the width of the floor in the transverse section of the fuselage and being an arced surface,
wherein a first distance separating the upper fuselage portion and the floor being substantially constant along the width of the floor,
wherein the fuselage includes two other fuselage portions extending between the upper fuselage portion and the floor of the first space and in the second fuselage space, the upper fuselage portion and the two other fuselage portions being portions of an arc of a circle in the transverse section of the fuselage,
wherein the upper fuselage portion is connected to a first fuselage portion of the two other fuselage portions at a first joining area forming a first continuous arc therebetween, and the upper fuselage portion is connected to a second fuselage portion of the two other fuselage portions at a second joining area forming a second continuous arc therebetween, and
wherein the width between the first joining area and the second joining area is substantially equal to the width of the floor.

2. The aircraft according to claim 1, wherein the first distance is greater than or equal to 1800 mm.

3. The aircraft according to claim 1, wherein the first distance ranges between 2100 and 2200 mm, and further comprising a baggage accommodation compartment in the first space in the vicinity of the upper fuselage portion, a second distance between the baggage accommodation compartment and the floor being greater than 1900 mm.

4. The aircraft according to claim 1, wherein the two other fuselage portions are identical and arranged symmetrically in relation to an axis of symmetry of the upper fuselage portion perpendicular to the floor in the transverse section of the fuselage.

5. The aircraft according to claim 1, wherein a radii of the two other fuselage portions being less than a radii of the upper fuselage portion.

6. The aircraft according to claim 1, wherein joining of the upper fuselage portion with each of the two other fuselage portions is implemented substantially at the base of the joining of the floor with each of the two other fuselage portions, respectively.

7. The aircraft according to claim 1, wherein the upper fuselage portion and the two other fuselage portions are portions of an arc of a circle in the transverse section of the fuselage with identical radius and extending over an identical sector.

8. The aircraft according to claim 7, wherein the fuselage further includes a fourth fuselage portion configured to connect the two other fuselage portions in the second fuselage space.

9. The aircraft according to claim 1, wherein the second space of the fuselage has a form in the transverse section of the fuselage configured to adapt to forms of a container.

10. The aircraft according to claim 1, wherein the first distance is greater than 2000 mm.

11. The aircraft according to claim 1, wherein the two other fuselage portions connect at a bottom most point of the second fuselage space.

12. The aircraft according to claim 1, wherein the first joining area is located directly above a point of intersection between an end of the floor and the first fuselage portion.

13. The aircraft according to claim 12, wherein the second joining area is located directly above a point of intersection between an other end of the floor and the second fuselage portion.

14. The aircraft according to claim 1, wherein a distance between the first joining area and the floor is substantially equal to a distance between the second joining area and the floor.

15. The aircraft according to claim 1, wherein an overhead storage area extends from the first joining area to the second joining area across the upper fuselage portion.

16. An aircraft comprising:

a fuselage including a floor extending in a longitudinal plane of the fuselage and separating a first space from a second space accommodated in the fuselage, wherein the first space includes an upper fuselage portion, which is an exterior wall of the aircraft, having a width substantially equal to the width of the floor in the transverse section of the fuselage, the width of the upper fuselage portion being an arced surface, wherein a first distance separating the upper fuselage portion and the floor being substantially constant along the width of the floor, wherein the fuselage includes two other fuselage portions extending between the upper fuselage portion and the floor of the first space and in the second fuselage space, the upper fuselage portion and the two other fuselage portions being portions of an arc of a circle in the transverse section of the fuselage, and wherein the upper fuselage portion and the two other fuselage portions are portions of an arc of a circle in the transverse section of the fuselage with identical radius and extending over an identical sector.

* * * * *